July 4, 1967     T. A. RUBLE     3,329,417
METHOD AND APPARATUS FOR CALCINING INORGANIC HYDRATES
Filed Sept. 1, 1964     3 Sheets-Sheet 1
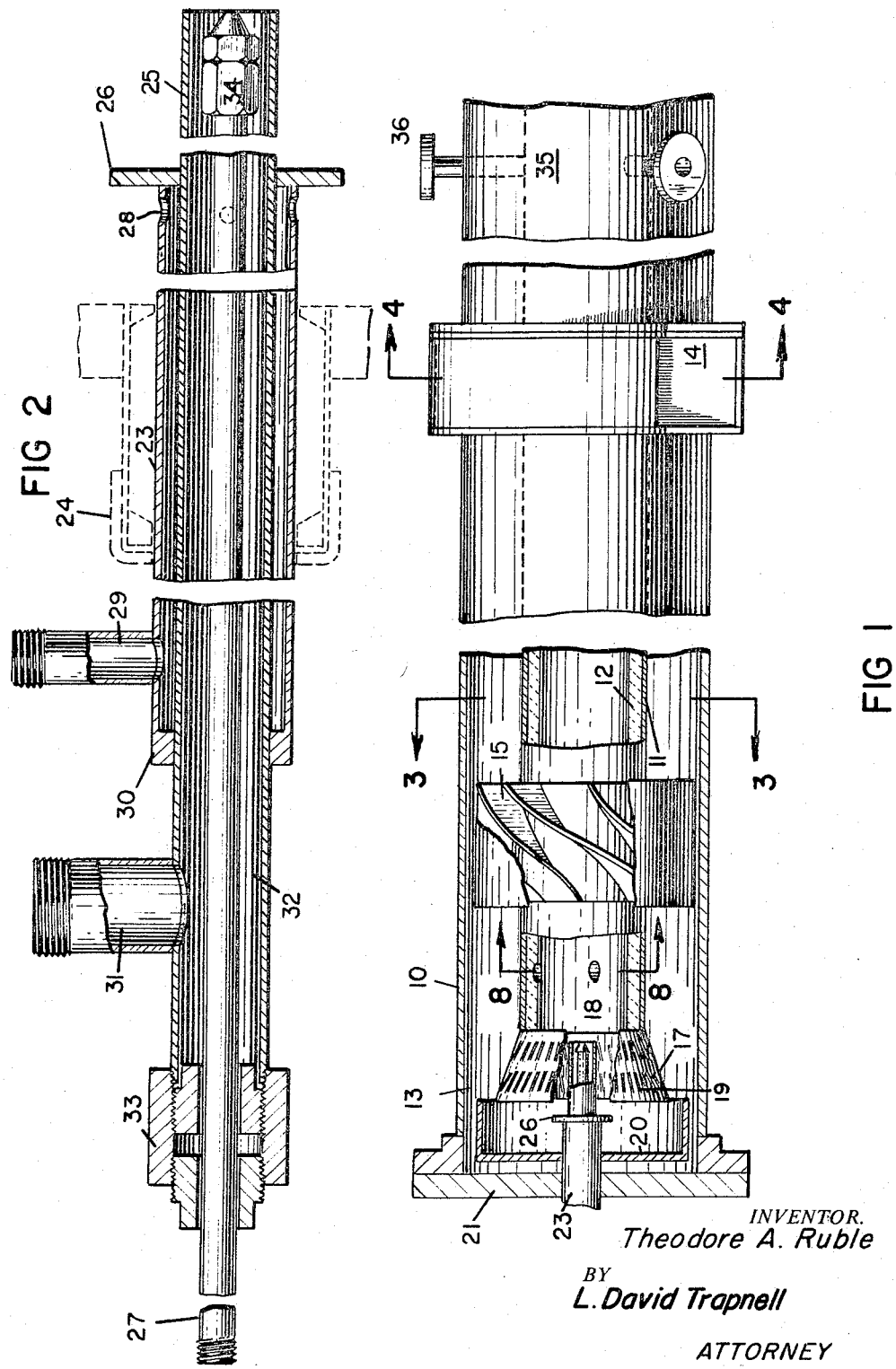
INVENTOR.
Theodore A. Ruble
BY
L. David Trapnell
ATTORNEY July 4, 1967 T. A. RUBLE 3,329,417
METHOD AND APPARATUS FOR CALCINING INORGANIC HYDRATES
Filed Sept. 1, 1964 3 Sheets-Sheet 2
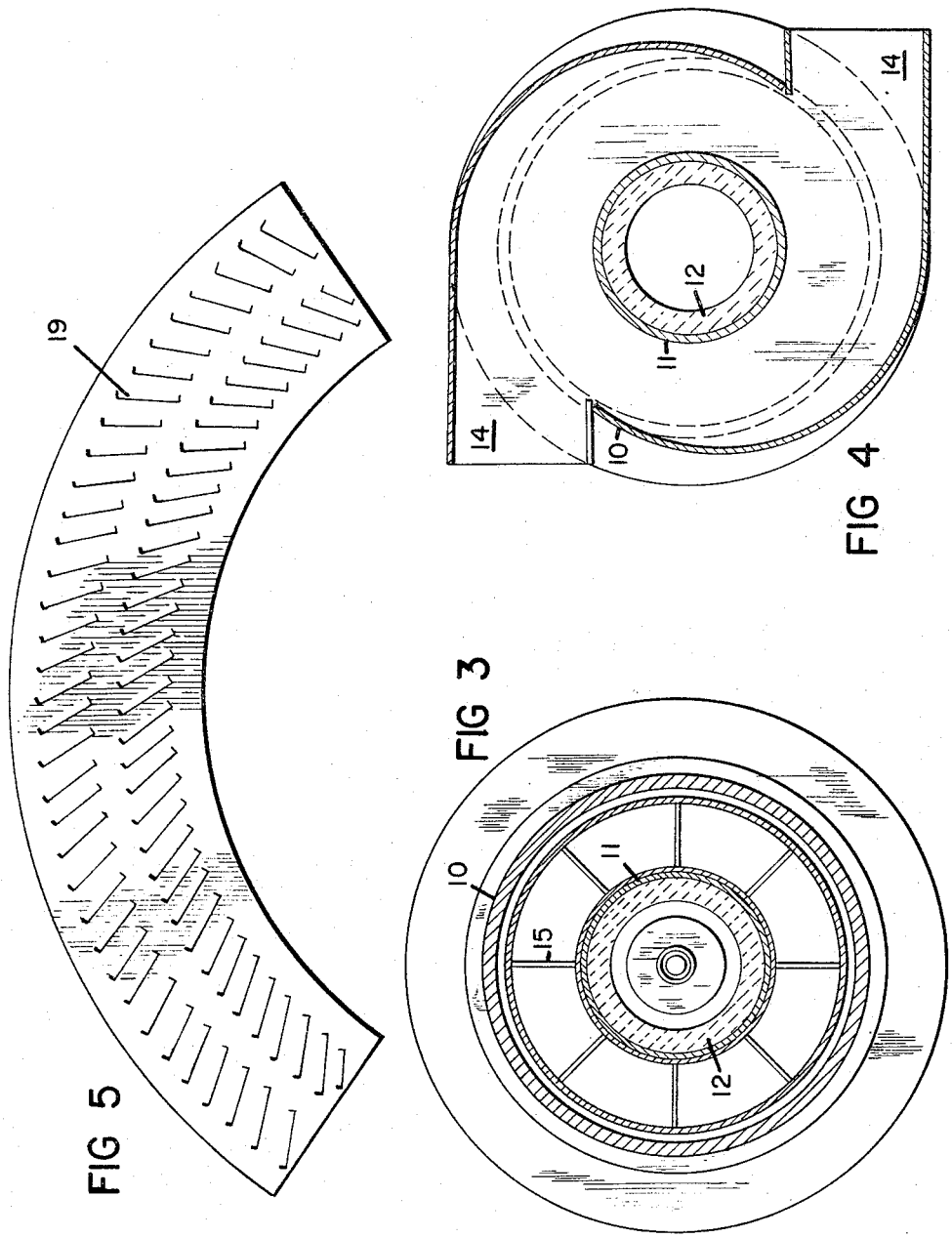
INVENTOR.
Theodore A. Ruble
BY
L. David Trapnell
ATTORNEY July 4, 1967 T. A. RUBLE 3,329,417
METHOD AND APPARATUS FOR CALCINING INORGANIC HYDRATES
Filed Sept. 1, 1964 3 Sheets-Sheet 3
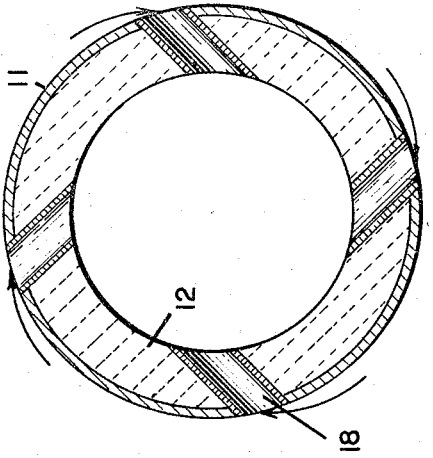
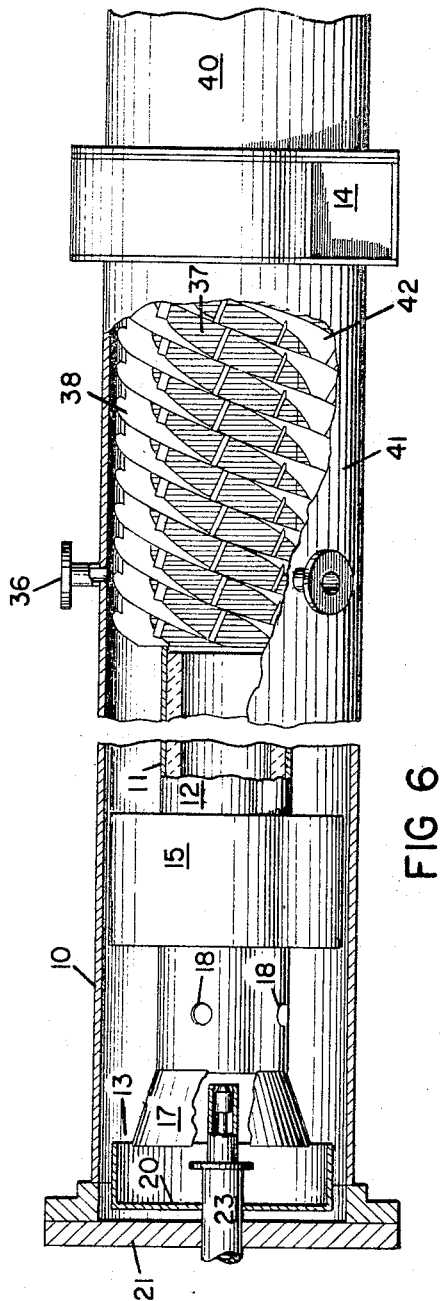
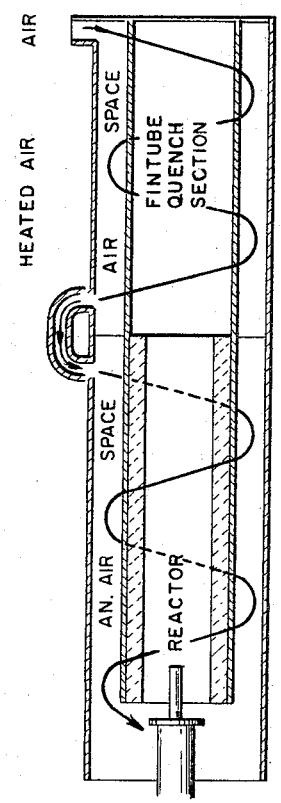
INVENTOR.
Theodore A. Ruble
BY
L. David Trapnell
ATTORNEY

3,329,417
METHOD AND APPARATUS FOR CALCINING INORGANIC HYDRATES

Theodore A. Ruble, Houston, Tex., assignor to Continental Carbon Company, Houston, Tex., a corporation of Delaware
Filed Sept. 1, 1964, Ser. No. 393,669
4 Claims. (Cl. 263—21)

This invention relates to the calcination of oxides, hydroxides, inorganic salts, sulfides and other materials such as cement that require high calculation temperatures to produce the desired product in a very finely divided condition; and particularly to methods and apparatus for performing the same.

It is, of course, well known that calcination of materials of the type referred to usually is time-consuming and requires equipment which is bulky and expensive to install, operate, and maintain.

The present invention seeks to overcome the immediately aforementioned difficulties by providing a novel method and apparatus by means of which such calcining operations are performed much more rapidly and inexpensively than heretofore.

According to the teachings of the present invention the products of calcination are of finer particle size because each particle is heat-treated separately in suspension in a highly velocity turbulent gas stream so that there is practically no chance of particle and crystal growth. The high rate of heat transfer to the particles causes them to break down by rapid chemical reaction and rapid thermal expansion. The size and cost of the necessary equipment is greatly reduced; temperatures are more easily and accurately controlled; and calcination reaction time is reduced to a minimum.

The present method and apparatus are particularly advantageous in calcining materials such as $Al(OH)_3$, $CaCO_3$, $CaSO_4 \cdot 2H_2O$ (gypsum), and sulfides of zinc, iron, and copper that decompose or react with oxygen to produce the desired finely divided solid chemical product together with a gaseous by-product.

Examples of the chemical reactions of the above are as follows:

$2Al(OH)_3 \qquad Al_2O_3 + 3H_2O$
$CaCO_3 \qquad CaO + CO_2$
$CaSO_4 \cdot 2H_2O \qquad CaSO_4 + 2H_2O$
$2ZnS + 3O_2 \qquad [1]\, 2ZnO + (2SO_2)$ The present invention, then, comprises the novel features generally outlined hereinabove which will be fully described with reference to certain illustrative embodiments shown in the accompanying drawings, in which:

FIG. 1 is a longitudinal elevational view, partly in section, illustrating one form of an apparatus embodying the teachings of the present invention;

FIG. 2 is a longitudinal elevation, partly in section and illustrating in greater detail the burner and injection assembly of the apparatus of FIG. 1;

FIG. 3 is a transverse view taken along line 3—3 of FIG. 1;

FIG. 4 is a transverse view taken along line 4—4 of FIG. 1;

FIG. 5 is a pattern layout for an element of the apparatus of FIG. 1;

FIG. 6 is a longtudinal side view, partly in section, of an embodiment in accordance with this invention, said view illustrating in detail the initial portion of a recovery system advantageously adapted for use in combination with apparatus of FIG. 1;

FIG. 7 illustrates diagrammatically a further modification of the embodiment shown in FIG 6; and

[1] Can be used to produce $H_2SO_4$ by-product.

FIG. 8 is a transverse view taken along line 8—8 in FIG. 1.

Referring to the drawings and particularly to FIG. 1 thereof, the numeral 10 desigantes an elongate metallic housing or shell which comprises the outer jacket of the apparatus of the present invention in which there is concentrically disposed an elongate metallic tube 11 of lesser diameter than that of said housing, said elongate tube being provided with an inner lining of refractory 12. The refractory lining is preferably constructed of a material having a relatively high heat transfer coefficient. Suitable refractory liners can be either pre-cast sleeves, fabricated from silica carbide for example and adapted to fit snugly within the elongate tube 11, or can be molded in place employing conventional castable refractory compositions.

Additionally, as a specific example, the outer housing or shell 10 can take the form of standard 18-inch (inside diameter) steel pipe with the inner elongate tube 11 being from about 10 to 14 inches in inside diameter and also of standard steel composition. The length of the housing can acceptably vary between about 10 and 15 feet and the length of the inner tube can suitably be about 2 to 3 feet less than the length selected for the shell member. The refractory lining 12 is desirably of the minimum thickness capable of protecting the tube 11 for an extended period of time. A 2-inch thick liner of a castable kaolin-based refractory within a 14-inch diameter tube may be employed in an apparatus of the type presently described.

Referring to the left-hand end of FIG. 1, the adjacent end of the inner elongate tube 11 terminates short of the corresponding end of the outer shell 10 thereby providing a cylindrical chamber 13 substantially unobstructed save for certain appurtenances disposed therein, the function of which will be described hereinafter.

In FIG. 1, free oxygen containing gas, as for example atmospheric air, enters tangential air inlet 14 at the right-hand end of the outer shell 10 to be circulated in an annular spacing between said shell and the inner tube 11 for the purposes stated earlier herein. The tangential air inlets 14 can acceptably take the form of a rectangular slot as shown or alternatively can be circular in design. While two tangential air inlets are shown in the instant figure, the disposition of which can be noted by reference to FIG. 4, more than two inlets can be provided and in some instances one of such inlets will suffice.

Disposed towards the left-hand end of downstream end opening of the inner tube 11 are various elements which individually and collectively can be utilized to impart an inwardly spiralling rotation to the input air progressing from the tangential air inlet 14 through the annular spacing and ultimately into said unobstructed chamber 13. More particularly, said elements can take the form of a section of helically disposed air-turning vanes 15, or an appropriately louvered metallic frusto-cone 17 with its smaller end suitable connected to the adjacent end of the inner tube 11, as by welding, bolting, etc. More specific details as to the construction of the metallic frusto-cone 17 which serves as a combustion chamber will appear hereinafter. As indicated, these elements can be used singularly or in combination as shown in FIG. 1. For greatest efficiency of purpose, however, it is desirable to employ the air-turning vanes 15 in conjunction with the frusto-cone 17. The section of air-tuning vanes is mounted within the annular spacing at a location somewhat removed longitudinally from the upstream end opening of the inner tube 11. In this manner, any tendency for the air to enter the chamber 13 or impinge upon the combustion chamber in a channeling fashion is substantially obviated. Any number of individual vanes can be used, and the pitch thereof can also be varied in order to obtain the precise degree or form of spiralling action desired. The vanes can be affixed in a number of suitable ways.

Also shown in FIG. 1 are a plurality of ports or inlets 18 providing open communication between the annular spacing and the inner tube. These ports are preferably proximately adjacent the downstream opening of the inner tube. As shown in detail in FIG. 8 said ports are positioned tangentially with respect to the inner cylindrical wall of inner tube 11. A provision of this type serves to facilitate the effective formation of the annular sheath of gas around the material being calcined within the inner tube.

The main body portion of the combustion chamber is provided with a plurality of rows of louvers 19. In FIG. 1, the louvers 19 are illustratively shown as being in a double row and extending obliquely in a scoop-like position with respect to the helical flow of air impinging thereon. With regard to size, the louvers can acceptably be approximately 2 inches long by ¼ to ½ inch wide for an installation of the size apparatus generally described herein.

In FIG. 5 of the drawings, there is shown a pattern layout of the combustion chamber 17.

Each one of the louvers 19 may be made by cutting along the solid lines shown in the pattern layout and bending the cut sections inwardly to provide a louvered area to be employed in operation with the direction of helical flow shown in FIG. 1 upon upwardly rolling the sheet into the form of a frustrum.

Within the cylindrical chamber 13, and in axial alignment therewith, is a heat shield 20 which can be fabricated from 10 gage, No. 309 stainless steel. Said heat shield can suitably resemble a shallow cylindrical pan having a diameter intermediate between the diameters of the inner tube 11 and the outer shell 10 and preferably approximately corresponding to the diameter of the latter as shown in drawing FIG. 1. The central apertured base of the heat shield is suitably supported by the adjacent cover member 21 enclosing the upstream end of the metallic housing.

With reference to FIG. 2, the burner and injection assembly generally depicted in FIG. 1 is shown in detail as comprising a tube 23 extending through the cover member 21 substantially axially and rigidly attached thereto by means of a packing gland 24 shown schematically by the dotted line portion of the FIG. 2. A tube 25 is disposed concentrically within the tube 23 and extends within the cylindrical chamber preferably beyond the extremity of the tube 23. A vertically disposed disc or circular plate 26 serves as a closure member for the annular spacing formed between tubes 23 and 25 at the extremity of said spacing disposed within the chamber 13. The primary purpose of disc 26 is to prevent blow-out of the flame under operating conditions. The disc 26 has a diameter which is substantially greater than the outside diameter of the tube 23 and is provided with a center aperture having a diameter substantially that of the outside diameter of tube 25. The disc is rigidly attached to the respective tubes by welding.

Concentrically mounted by means of spacers (not shown) within tube 25 is a pipe 27 through which the material to be calcined is supplied to the apparatus, and it terminates with a spray nozzle at a point approximately flush with the corresponding extremity of tube 25. Immediately behind disc 26 are a plurality of radially oriented apertures 28 through tube 23 communicating with annular spacing formed between said tube and tube 25. The other (and externally projecting) extremity of tube 23 is provided with an annular closure member 30. Combustion gas is supplied to the apertures 28 through the gas inlet connection 29. Rearwardly of the annular closure member 30 is provided an air inlet connection 31 through which air is introduced into the annular air chamber 32 formed by the inner surface of tube 25 and outer surface of the liquid supply pipe 27; said annular chamber 32 being provided with a closure member 33. The axial air flowing within the annular chamber 32 forms a concentrated stream on the fluent material emanating from the spray head 34 and thereby aids in directing the spray down the center of the inner tube 11. However, the primary function of said annular air flow is to prevent solids from forming on the nozzle tip to the degree whereby its spraying capacity is impaired. The spray head, together with the annular air introduction means described, can be positioned at any point along the axis of the chamber 13 or can even be positioned within the inner tube 11 itself.

In FIG. 1 there is shown the initial part of a recovery system in the form of a quench section. As illustrated in the drawings, this section consists of a housing member 35 of substantially the same diameter as the outer shell 10 and rigidly coupled to the latter in axial alignment therewith. The said attaching or coupling means can be used at the same time to form a closure member for the annular spacing between inner tube 11 and the outer shell housing 10 at their downstream extremities. The inner diameter of the quench section is shown as being of the same diameter as the inner diameter of the refractory lining tube 11. A thick lining of a refractory may be used within the quench housing member in order to reduce the diameter thereof to approximately that of the inner diameter of adjacent reactor tube. The quench section is provided with the radial spray ports 36 through which there extends a water pipe terminating adjacent to the center line of the inner tube 11 and carrying a spray head from which the necessary quenching spray is delivered in order to effect cooling of the effluent emanating from the reaction zone within the inner tube 11.

As previously mentioned, in the operation of the apparatus there may arise instances where it is desirable to obtain combustion air preheat temperatures in excess of the maximum attainable in accordance with the embodyment shown in FIG. 1.

FIG. 6 illustrates a method or more strictly an apparatus modification which will result in such higher combustion air preheat temperatures. This figure at the left-hand side depicts an apparatus assembly identical with that of the reactor section shown in FIG. 1. The right-hand part of the figure illustrates the novel quench section contemplated for this embodiment which is formed by a downstream extension of the inner tube 11 and outer shell 10, that is, employing lengths of these respective tubular members greater than that required for the reactor section. As can be noted from the figure, fins are provided on the inner tube 11 starting approximately adjacent to the point where the refractory lining of the reactor section terminates. In so far that the fin-tube section of the apparatus is a continuation of the inner or reactor tube it is desirable to use a heat resistant steel such as stainless steel for this tubular member. Because of the refractory lining existing in the reaction zone, standard steel may be used for this purpose. However, in spite of the quenching or sudden cooling of the effluent gases emerging from the reaction zone, the temperatures encountered in the quench section are sufficiently high as to have an adverse effect on this tube should standard steel be used. Accordingly, the most expeditious way of constructing the present embodiment is to use a continuous stainless or equivalent heat-resistant steel tube for the purpose of a reaction zone and quench section.

The cooling fins 37 emanating from the inner tube 11 in the quench section 41 can be approximately 1-inch in width and spaced approximately ¼ inch apart. The fins are shown as concentric projections parallelly disposed along the horizontal axis of the tube 11 of the quench section. However, the fins may be disposed helically if so desired. The cooling fins 37 are attached to the tube 11 by any suitable method which results in efficient heat conductivity between the tube member and the attached fin. Thus, the fins may be welded to the tube or recessed into channels cut into the tube and approximately soldered therein.

In order to achieve efficient contact of the combustion air with the aforedescribed fins, it is desirable to provide in the annular spacing within the quench section 41, that is, in the annular spacing formed by the extension of reactor tube 11 and the housing shell 10, helically disposed air directing channels. In the illustrative embodiment, the helically disposed vanes 38 accomplish said channeling. To further provide for the more efficient heat transfer conditions between the air and fins the members 42, consisting of narrow plates, are interposed between the adjacent vanes 38 and so positioned as to facilitate the incidence of the helically progressing air onto the fin members. Thus a zig-zag air flow pattern is beneficially accomplished within the helical channels.

The combustion air after passing the length of helicoid passageway within the annular space surrounding the quench section enters into the substantially unobstructed annular spacing formed between the outer shell 10 and the refractory lined reaction section of the inner tube 11. The helical flow imparted to the combustion air within the helicoid passageway is ordinarily sufficient to maintain this type of flow throughout the upstream or remainder portion of the annular spacing and thence into the chamber 13. However, it may be desirable to provide a section of air-turning vanes 15 as illustrated in connection wtih the discussion of the embodiment exemplified in FIG. 1 in order to orientate the air direction to the precise degree desired. The turning vanes 15 are disposed in the same general direction as the vanes 38 within the quench section.

In the instant embodiment, the combustion air is initially introduced into the system through a tangential air inlet 14 having a construction similar to that of the air inlet 14 shown in FIG. 1 and more particularly illustrated in FIG. 4. The tangential air input(s) 14 is disposed at the downstream extremity of the shell portion 10 constituting the housing for the quench section. The ports 36 shown disposed towards the upstream portion of the quench section are adapted for the insertion of water pipes. In operation, the water pipes are inserted in said ports and the outlet portion thereof provided with a quenching spray which spray is directed towards the center line of the reaction zone in the same manner as described previously herein.

The calcined material produced in the reaction zone after proceeding through the quench section is removed from the effluent gases by means of the usual collecting devices which are well known in the art. The member 40 represents a communication to said type of recovery system.

A variation of the embodiment described directly hereinabove is illustrated schematically in FIG. 7. The essential difference between this embodiment and that exemplified in FIG. 6 is that the quench section and the reactor section do not share common tubular members for their outer shells and inner tubes. However, it is contemplated that the quench section be a fin-tube section such as described hereinabove and that the reaction section correspond to that described in connection with FIG. 1. The air preheated in the quench section is conducted into the annular spacing within the reaction section by any suitable conduit method. Utilization of the concept of this embodiment permits the employment of a standard steel tube for the inner tube in the reaction section rather than using stainless steel for this section as would be otherwise preferred if the construction were that corresponding to the embodiment of FIG. 6.

*Operation*

Immediately following are four (4) methods of introducing the material to be calcined in the aforementioned hot turbulent gas stream in the reactor:

(1) If soluble, it may be introduced as an aqueous solution through the liquid supply pipe 27 and spray head 34.

(2) If insoluble, it can be introduced as an aqueous slurry through the same liquid supply pipe and spray head.

(3) Through the liquid supply pipe 27 and spray head 34 in the form of an oil slurry. In this case the excess air and oil flow rates are regulated so there is sufficient excess air to completely burn all of the oil. This method is excellent where moderately high temperatures are necessary for calcination.

(4) Removing the liquid supply pipe 27 and the spray head 34 from the axial air pipe 25 and introducing the material as a suspension in the axial air through the axial air pipe 25.

Venturi shape reaction tubes may be used so the material can commence its calcination in the Venturi throat at a point of maximum gas velocity and turbulence. The larger discharge diameter on the Venturi may be used to give more reaction time. Typical blast gas linear velocity for calcination ranges from 200 to 2,000 ft./sec. and the reaction time from 0.1 to 10.0 seconds. Calcination temperatures, using air for combustion, from 1200 F. to 3200 F. can be used by controlling the combustion air preheat and the air/gas ratio. Where super high calcination temperatures are required in a range of 3200 F. to 5000 F. oxygen-enriched air or pure oxygen can be used for combustion. For this type of operation special high temperature refractory tube liners must be used.

While I have shown and described certain illustrative embodiments of the invention it will be readily understood that the invention is not limited thereto and that various modifications can be made without departure from the spirt thereof as defined by the following claims.

What I claim is:

1. A furnace for calcining inorganic hydrates and the like comprising an elongate metallic tubular housing; an elongate tubular reactor disposed within and axially of said elongate metallic tubular housing and providing an air jacket therebetween; one end of said elongate metallic tubular housing extending beyond the corresponding end of said elongate metallic tubular reactor and providing an unobstructed chamber therein; a closure for the aforementioned end of said elongate metallic tubular housing; an air inlet disposed adjacent the other end of said elongate metallic tubular housing and communicating with said air jacket; a gas burner disposed in said unobstructed chamber and in axial alignment with said elongate metallic tubular reactor; and means extending axially through said closure into the unobstructed chamber of the tubular housing for supplying material to be calcined directly to the flame produced by said gas burner.

2. A furnace for calcining inorganic hydrates and the like comprising an elongate metallic tubular housing; an elongate tubular reactor disposed within and axially of said elongate metallic tubular housing and providing an air jacket therebetween; one end of said elongate metallic tubular housing extending beyond the corresponding end of said elongate metallic tubular reactor and providing an unobstructed chamber therein; a closure for the aforementioned end of said elongate metallic tubular housing; an air inlet disposed adjacent the other end of said elongate metallic tubular housing and communicating with said air jacket; a gas burner disposed in said unobstructed chamber and in axial alignment with said elongate metallic tubular reactor; means extending axially through said closure into the unobstructed chamber of the tubular housing for supplying material to be calcined directly to the flame produced by said gas burner; and a flared extension on said corresponding end of said elongate tubular reactor and in axial alignment with said gas burner; said flared extension being provided with a series of louvers for receiving air from said air jacket.

3. A furnace for calcining inorganic hydrates and the like comprising an elongate metallic tubular housing; an elongate tubular reactor disposed within and axially of said elongate metallic tubular housing and providing an air jacket therebetween; one end of said elongate metallic tubular housing extending beyond the corresponding end of said elongate metallic tubular reactor and providing an unobstructed chamber therein; a closure for the aforementioned end of said elongate metallic tubular housing; an air inlet disposed adjacent the other end of said elongate metallic tubular housing and communicating with said air jacket; a gas burner disposed in said unobstructed chamber and in axial alignment with said elongate metallic tubular reactor; means extending axially through said closure into the unobstructed chamber of the tubular housing for supplying material to be calcined directly to the flame produced by said gas burner; and a series of heat-transfer fins on the outer surface of said elongate tubular reactor; said heat transfer fins being adapted to guide the air from said air inlet toward said corresponding end of said elongate tubular reactor.

4. A furnace for calcining inorganic hydrates and the like comprising an elongate metallic tubular housing; an elongate tubular reactor disposed within and axially of said elongate metallic tubular housing and providing an air jacket therebetween; one end of said elongate metallic tubular housing extending beyond the corresponding end of said elongate metallic tubular reactor and providing an unobstructed chamber therein; a closure for the aforementioned end of said elongate metallic tubular housing; an air inlet disposed adjacent the other end of said elongate metallic tubular housing and communicating with said air jacket; a gas burner disposed in said unobstructed chamber and in axial alignment with said elongate metallic tubular reactor; means extending axially through said closure into the unobstructed chamber of the tubular housing for supplying material to be calcined directly to the flame produced by said gas burner; a flared extension therefor said corresponding end of said elongate tubular reactor and in axial alignment with said gas burner; said flared extension being provided with a seires of louvers for receiving air from said air jacket; and a series of heat-transfer fins on the outer surface of said elongate metallic tubular reactor; said heat transfer fins being adapted to guide the air from said air inlet toward said corresponding end of said elongate tubular reactor.

References Cited

UNITED STATES PATENTS

| 2,762,619 | 9/1956 | Booth | 263—21 |
| 2,985,438 | 5/1961 | Prowler | 263—19 |
| 3,145,019 | 8/1964 | Clute | 263—21 |

FOREIGN PATENTS 297,240  9/1928  Great Britain.

FREDERICK L. MATTESON, JR., *Primary Examiner.*

DONLEY J. STOCKING, *Examiner.*

D. A. TAMBURRO, *Assistant Examiner.*